United States Patent
Ganesh et al.

(10) Patent No.: US 12,462,067 B1
(45) Date of Patent: Nov. 4, 2025

(54) ENDORSEMENT OF DEVICES IN A PROCESSING SYSTEM

(71) Applicant: AMERICAN MEGATRENDS INTERNATIONAL, LLC, Duluth, GA (US)

(72) Inventors: Sachin Ganesh, Chennai (IN); Ramesh R, Chennai (IN); Dhanaraj Velu, Chennai (IN)

(73) Assignee: AMERICAN MEGATRENDS INTERNATIONAL, LLC, Duluth, GA (US)

(*) Notice: Subject to any disclaimer, the term of this patent is extended or adjusted under 35 U.S.C. 154(b) by 239 days.

(21) Appl. No.: 18/319,389

(22) Filed: May 17, 2023

(51) Int. Cl.
*G06F 21/64* (2013.01)
*G06F 21/57* (2013.01)
*G06F 21/60* (2013.01)

(52) U.S. Cl.
CPC ............ *G06F 21/64* (2013.01); *G06F 21/575* (2013.01); *G06F 21/602* (2013.01)

(58) Field of Classification Search
CPC ....... G06F 21/64; G06F 21/575; G06F 21/602
See application file for complete search history.

(56) References Cited

U.S. PATENT DOCUMENTS

| | | | |
|---|---|---|---|
| 10,181,124 B2 | 1/2019 | Berke et al. | |
| 10,896,266 B1 | 1/2021 | BeSerra et al. | |
| 11,379,588 B2 | 7/2022 | Hird et al. | |
| 11,409,878 B2 * | 8/2022 | Ali | G06F 21/572 |
| 2011/0295908 A1 | 12/2011 | To et al. | |
| 2014/0182001 A1 * | 6/2014 | Matsumoto | G06F 21/10 726/31 |
| 2019/0229893 A1 * | 7/2019 | Nenov | G06F 9/44505 |
| 2020/0111539 A1 * | 4/2020 | Yamaguchi | G06F 11/3062 |
| 2020/0293694 A1 * | 9/2020 | Gonzalez Mendez | G06F 21/575 |
| 2023/0353391 A1 * | 11/2023 | Dover | H04L 9/3268 |
| 2024/0078158 A1 * | 3/2024 | Samuel | G06F 11/2048 |

OTHER PUBLICATIONS

Serial presence detect, Apr. 26, 2023, Wikipedia, Introduction Paragraph and Table: âSPD Contents for DDR4 SDRAM (Year: 2023).*

* cited by examiner

Primary Examiner — Jeffrey C Pwu
Assistant Examiner — Edgar W Xie
(74) Attorney, Agent, or Firm — Newport IP, LLC; Leonard J. Hope

(57) ABSTRACT

A firmware executes upon power on of a processing system and identifies any memory devices present in the processing system. The firmware then obtains uniquely identifying information for the memory devices such as, for example, part numbers and serial numbers. If the boot is the first boot of the processing system, the firmware transmits the uniquely identifying information for the memory devices to an endorsement service. The endorsement service, in turn, receives the identifying information and consults inventory data to determine if the memory devices are authorized for use in the processing system. The endorsement service then returns a response to the processing system that identifies any of the memory devices that are not authorized for use with the processing system. Upon receiving the response, the firmware disables any memory devices identified by the endorsement service as not being authorized for use with the processing system.

17 Claims, 5 Drawing Sheets

ENDORSEMENT OF DEVICES IN A PROCESSING SYSTEM

BACKGROUND

In certain types of computing environments such as, for example, those requiring very high levels of performance or security, it may be necessary to limit the utilization of incompatible or unauthorized devices in a processing system. The utilization of such incompatible or unauthorized devices in a processing system can result in the processing system experiencing reduced performance, compatibility, security, or even malfunction.

For instance, the addition of an incompatible memory device, such as a random access memory ("RAM") device, to a server computer in a data center might impact the performance or security of the server computer. The addition of other types of incompatible or untrusted devices to a processing system can have a similar negative impact on performance, compatibility, and security. It can, however, be very difficult for a system administrator to determine that an incompatible or unauthorized device has been installed in a processing system and to prevent the use of the device.

It is with respect to these and other considerations that the disclosure made herein is presented.

SUMMARY

Technologies are described herein for endorsement of devices in a processing system. Through implementations of the disclosed technologies, devices in a processing system, such as memory devices, can be endorsed in order to ensure that incompatible or unauthorized devices cannot be utilized in the processing system. Through the utilization of this mechanism, incompatible or unauthorized devices in a processing system can be identified and disabled. As a result, the possibility that an unauthorized device might negatively impact the performance, compatibility, or security of a processing system or cause a malfunction can be minimized. Technical benefits other than those specifically mentioned herein can also be realized through an implementation of the disclosed technologies.

In order to achieve the technical benefits described above, and potentially others, a processing system executes a firmware, such as a Unified Extensible Firmware Interface ("UEFI") Specification-compliant firmware, in one embodiment. The firmware executes upon power on of the processing system and identifies any memory devices present in the processing system. For example, and without limitation, the firmware might identify any dual in-line memory modules ("DIMMs") or other types of memory devices that have been installed in the processing system. In this regard it is to be appreciated that while the embodiments disclosed herein are primarily presented in the context of memory devices, the technologies can be utilized to endorse other types of devices that have been installed in a processing system in a similar manner.

Once the memory devices have been identified, the firmware obtains uniquely identifying information for the memory devices such as, for example, part numbers and serial numbers. For instance, in an embodiment where the memory devices are DIMMs, the firmware retrieves the uniquely identifying information (e.g., the part numbers and serial numbers for the DIMMs) from serial presence detect ("SPD") data stored in the DIMMs at the time of manufacture. Other types of uniquely identifying information is obtained from the memory devices in other embodiments.

When the processing system is first booted, the firmware transmits the uniquely identifying information for the memory devices to an endorsement service. The endorsement service, in turn, receives the identifying information and consults inventory data to determine if the memory devices are authorized for use in the processing system. The endorsement service then returns a response to the processing system that identifies any of the memory devices that are not authorized for use with the processing system. Upon receiving the response, the firmware disables any memory devices identified by the endorsement service as not being authorized for use with the processing system.

The firmware also generates cryptographic hashes for the memory devices that are identified as being authorized for use with the processing system and stores the cryptographic hashes at the processing system. In an embodiment, the firmware stores the cryptographic hashes in a non-volatile memory ("NVM") of a trusted platform module ("TPM") in the processing system. The cryptographic hashes are stored in another location in other embodiments. The firmware then permits the processing system to continue booting. For example, the processing system may boot an operating system.

Upon a boot of the processing system subsequent to the first boot, the firmware generates cryptographic hashes for the memory devices present in the processing system. The firmware then determines if the newly generated cryptographic hashes for the memory devices currently present in the processing system match the previously stored cryptographic hashes for the memory devices that the endorsement service indicated are authorized for use with the processing system.

If the firmware determines that the cryptographic hashes for the memory devices currently present in the processing system do not match the previously stored cryptographic hashes for memory devices that are authorized for use with the processing system, the firmware transmits the uniquely identifying information for memory devices that do not have matching previously stored cryptographic hashes to the endorsement service.

In response thereto, the endorsement service determines if any of the memory devices not that do not have matching previously stored cryptographic hashes are not authorized for use with the processing system. The endorsement service then transmits a response to the processing system that identifies any of the memory devices that do not have matching previously stored cryptographic hashes and that are not authorized for use with the processing system. In response thereto, the firmware disables memory devices that do not have matching previously stored cryptographic hashes and that the endorsement service indicated are not authorized for use with the processing system.

In an embodiment, the firmware also generates cryptographic hashes for memory devices that do not have matching previously stored cryptographic hashes but that the endorsement service identifies as being authorized for use with the processing system. The firmware stores the cryptographic hashes at the processing system such as, for example, in the NVM of a TPM in the processing system. The firmware then permits the processing system to continue booting. For example, the processing system may boot an operating system.

It should be appreciated that the above-described subject matter can also be implemented as a computer-controlled apparatus, a computer process, a computing system, or as an article of manufacture such as a computer-readable medium.

These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for endorsement of devices in a processing system. Through implementations of the disclosed technologies, incompatible or unauthorized devices in a processing system can be identified and disabled.

As a result, the possibility that an unauthorized device might negatively impact the performance, compatibility, or security of a processing system or cause a malfunction can be minimized. Technical benefits other than those specifically mentioned herein can also be realized through an implementation of the disclosed technologies. Additional details regarding these aspects will be provided below with regard to FIGS. 1-4.

Before discussing the disclosed technologies in detail, it is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
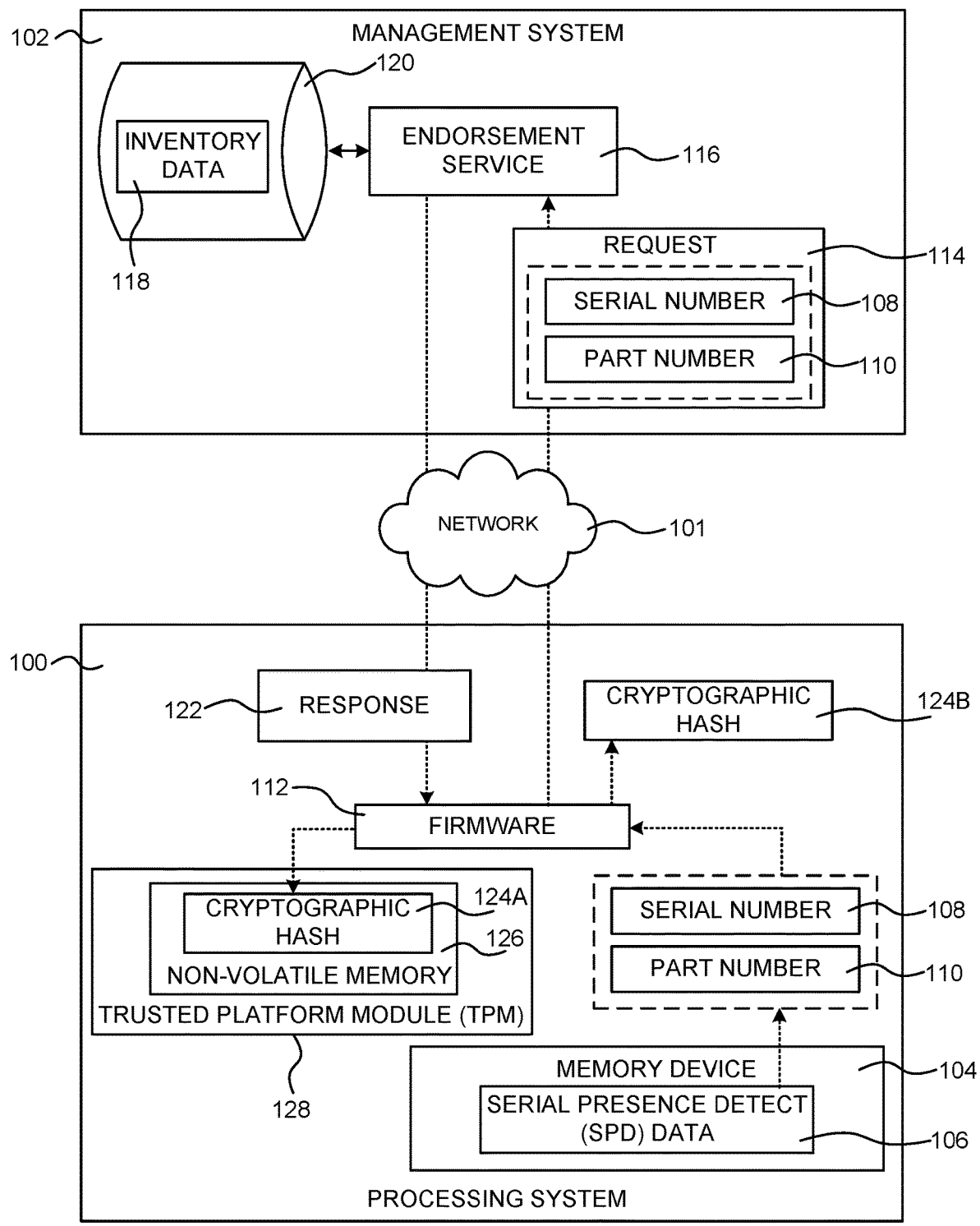
FIG. 1 is a system architecture diagram illustrating aspects of the configuration and operation of a management system and a processing system configured for endorsement of devices, according to one or more embodiments presented herein.

FIG. 1 is a system architecture diagram illustrating aspects of the configuration and operation of a management system 102 and a processing system 100 configured for endorsement of devices, according to one or more embodiments presented herein. As shown in FIG. 1 and described in greater detail below, the management system 102 provides functionality for managing various aspects of the operation of the processing system 100. For example, and without limitation, the management system 102 can include various components configured for monitoring the performance, security, and other aspects of the operation of the processing system 100. At least some of these components will be described in greater detail below.

In one embodiment, the processing system 100 is a server computer operating in a data center. The processing system 100, however, can comprise another type of computing device operating in another type of environment in other embodiments. In this regard, it is also to be appreciated that while only a single processing system 100 has been illustrated in FIG. 1, devices in many such processing systems 100 can be endorsed using the technologies disclosed herein in various configurations.

In the embodiment shown in FIG. 1, the processing system 102 also includes a firmware 112. The firmware 112 provides functionality for booting the processing system 102. The firmware 112 also includes functionality for providing an interface to the platform hardware to an operating system or application programs executing on the operating system. The firmware 112 might also provide other types of functionality. Examples of the firmware 112 include, but are not limited to, a PC-compatible basic input/output system ("BIOS") and a firmware compatible with the UEFI Specification. Other types of firmware 112 might also be utilized in other embodiments. Details regarding the configuration and operation of a UEFI Specification-compliant firmware 112 are provided below with regard to FIG. 4.

The processing system 102 also include a trusted platform module ("TPM") 128 or another type of hardware trust evaluation module in some embodiments. Generally, the TPM 128 offers facilities for the secure generation of cryptographic keys, and limitation of their use, in addition to a hardware true random number generator. The TPM 128 can also include other capabilities such as those described herein for endorsement of devices in the processing system 100 It should be appreciated that while a TPM 128 is utilized in embodiments as a hardware trust evaluation device, other types of hardware trust evaluation devices can be utilized in other configurations. Additional details regarding the utilization of the TPM 128 in the embodiments disclosed herein will be provided below.

As described briefly above, the firmware 112 executes upon power on of the processing system 100. During execution, the firmware 112 identifies any memory devices 104 that are present in the processing system 100. For example, and without limitation, the firmware might identify DIMMs or other types of memory devices 104 that have been installed in the processing system 100. In this regard it is to be appreciated that while the embodiments disclosed herein are primarily presented in the context of memory devices 104, the technologies can be utilized to endorse other types of devices that have been installed in a processing system 100 in a similar manner.

Once the memory devices 104 have been identified, the firmware 112 obtains uniquely identifying information for the identified memory devices 104 such as, for example, part numbers 110 and serial numbers 108. For instance, in an embodiment where the memory devices 104 are DIMMs, the firmware 112 retrieves the uniquely identifying information (e.g., the part numbers and serial numbers for the DIMMs) from SPD data 106 that is stored in the DIMMs during manufacturing. Other types of uniquely identifying information is obtained from the memory devices 104 or other devices in other embodiments.

When the processing system 100 is first booted, the firmware 112 transmits an endorsement request 114 that includes the uniquely identifying information (e.g., the part numbers 110 and serial numbers 108) for the memory devices 104 to an endorsement service 116 executing in the management system 102. The processing system 100 may be communicatively coupled to the management system 102 by way of a network 101, such as the internet.

The endorsement service 116, in turn, receives the identifying information and consults inventory data 118 stored in an appropriate data store 120 to determine if the memory devices 104 are authorized for use in the processing system 100. The inventory data 118 includes identifying information (e.g., the part numbers 110 and serial numbers 108) for memory devices 104 that have been authorized for use with the processing system 100. A user interface or another type of interface can be provided through which a user can specify the inventory data 118.

The endorsement service 116 then returns a response 122 to the processing system 100 that identifies any of the memory devices 104 that are not authorized for use with the processing system 100. The response 122 might also identify those memory devices 104 that are authorized for use in the processing system 100.

Upon receiving the response 122, the firmware 112 disables any memory devices 104 identified by the endorsement service 116 as not being authorized for use with the processing system 100. The firmware 112 also generates cryptographic hashes 124A for the memory devices 104 that have been identified as being authorized for use with the processing system 100 and stores the cryptographic hashes 124A at the processing system. The SHA-512 hashing algorithm is utilized in an embodiment. Other hashing algorithms can also be utilized.

In an embodiment, the firmware 112 stores the cryptographic hashes in a NVM 126 of the TPM 128. The cryptographic hashes 124A are stored in another location in other embodiments. The firmware 112 then permits the processing system 100 to continue booting. For example, the processing system 100 may boot an operating system.

Upon a boot of the processing system 100 subsequent to the first boot, the firmware 112 identifies the memory devices 104 and generates cryptographic hashes 124B for the memory devices 104 currently present in the processing system 100. The firmware 112 then determines if the newly generated cryptographic hashes 124B for the memory devices 104 currently present in the processing system 100 match the previously stored cryptographic hashes 124A for the memory devices 104 that the endorsement service 116 indicated are authorized for use with the processing system 100.

If the firmware 112 determines that the cryptographic hashes 124B for the memory devices 104 currently present in the processing system 100 do not match the previously stored cryptographic hashes 124A, this indicates that one or more new memory devices 104 have been added to the processing system 100 or that one or more previously identified memory devices 104 are malfunctioning and returning incorrect identifying information. In this case, the firmware 112 transmits another request 114 with the uniquely identifying information (e.g., the part numbers 110 and serial numbers 108) for memory devices 104 that do not have matching previously stored cryptographic hashes 124A to the endorsement service 116.

In response thereto, the endorsement service 116 determines if any of the memory devices 104 not that do not have matching previously stored cryptographic hashes 124A are not authorized for use with the processing system 100 utilizing the inventory data 118 in the manner described above. The endorsement service 116 then transmits a response 122 to the processing system 100 that identifies any of the memory devices 104 that do not have matching previously stored cryptographic hashes and that are not authorized for use with the processing system 100. In response thereto, the firmware 112 disables memory devices 104 that do not have matching previously stored cryptographic hashes 124A and that the endorsement service 116 indicated are not authorized for use with the processing system 100.

In an embodiment, the firmware 112 also generates cryptographic hashes 124 for memory devices 104 that do not have matching previously stored cryptographic hashes 124A but that the endorsement service 116 identifies as being authorized for use with the processing system 100. The firmware 112 stores these cryptographic hashes 124 at the processing system 100 such as, for example, in the NVM 126 of the TPM 128 in the processing system 100.

The firmware 112 then permits the processing system 100 to continue booting. For example, the processing system may boot an operating system. Additional details regarding the various aspects described above with respect to FIG. 1 will be provided below with regard to FIGS. 2-4.

It is to be appreciated that FIG. 1 has been simplified to provide a high level overview of the technologies disclosed herein, and that many other software and hardware components can be utilized to implement the functionality disclosed herein. For example, and without limitation, networking components can be utilized to connect the processing system 100 to the management system 102.

Figure 2A:
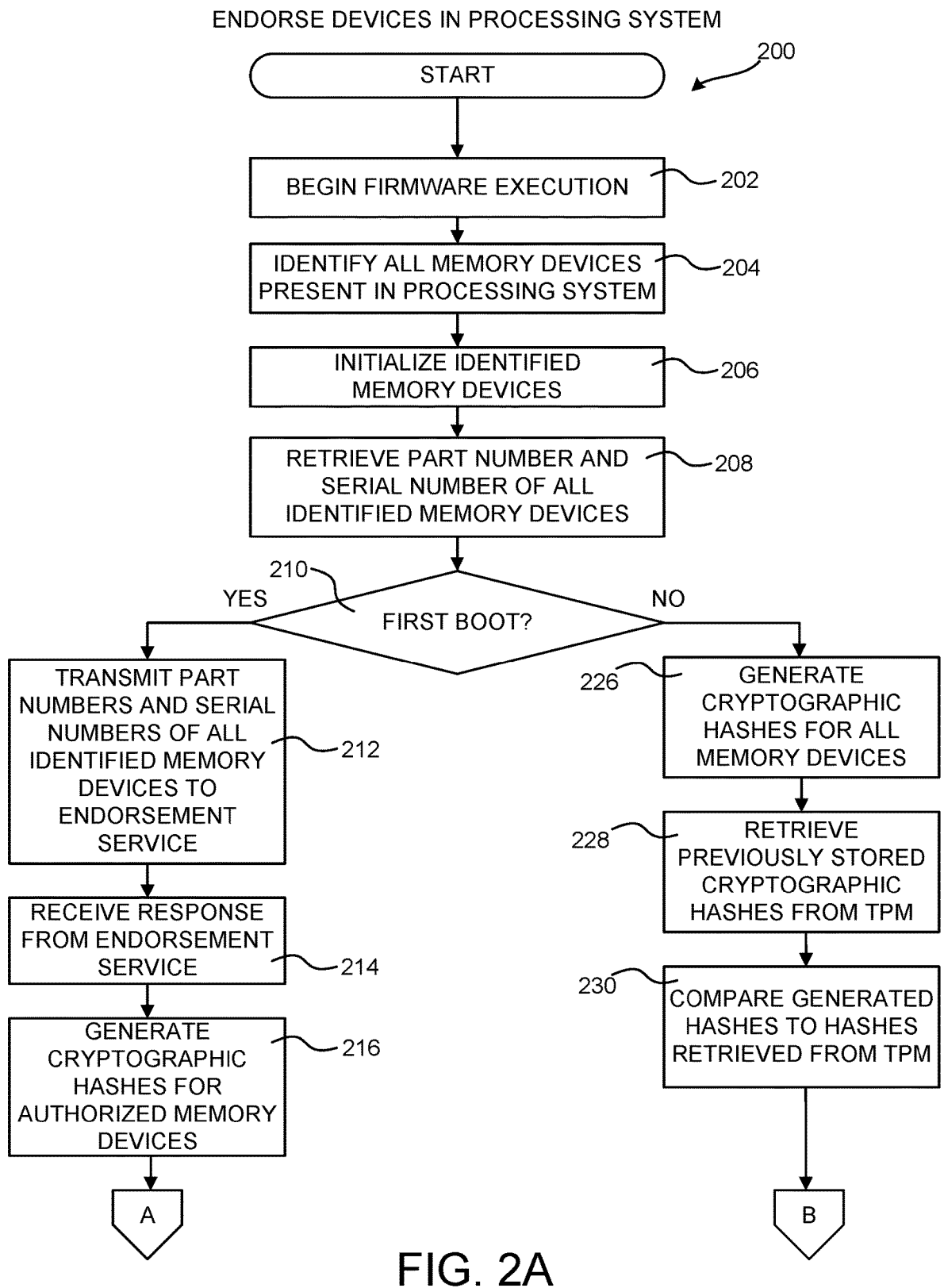
FIG. 2A is a flow diagram showing aspects of a routine for endorsement of devices in a processing system, according to one embodiment disclosed herein.
Figure 2B:
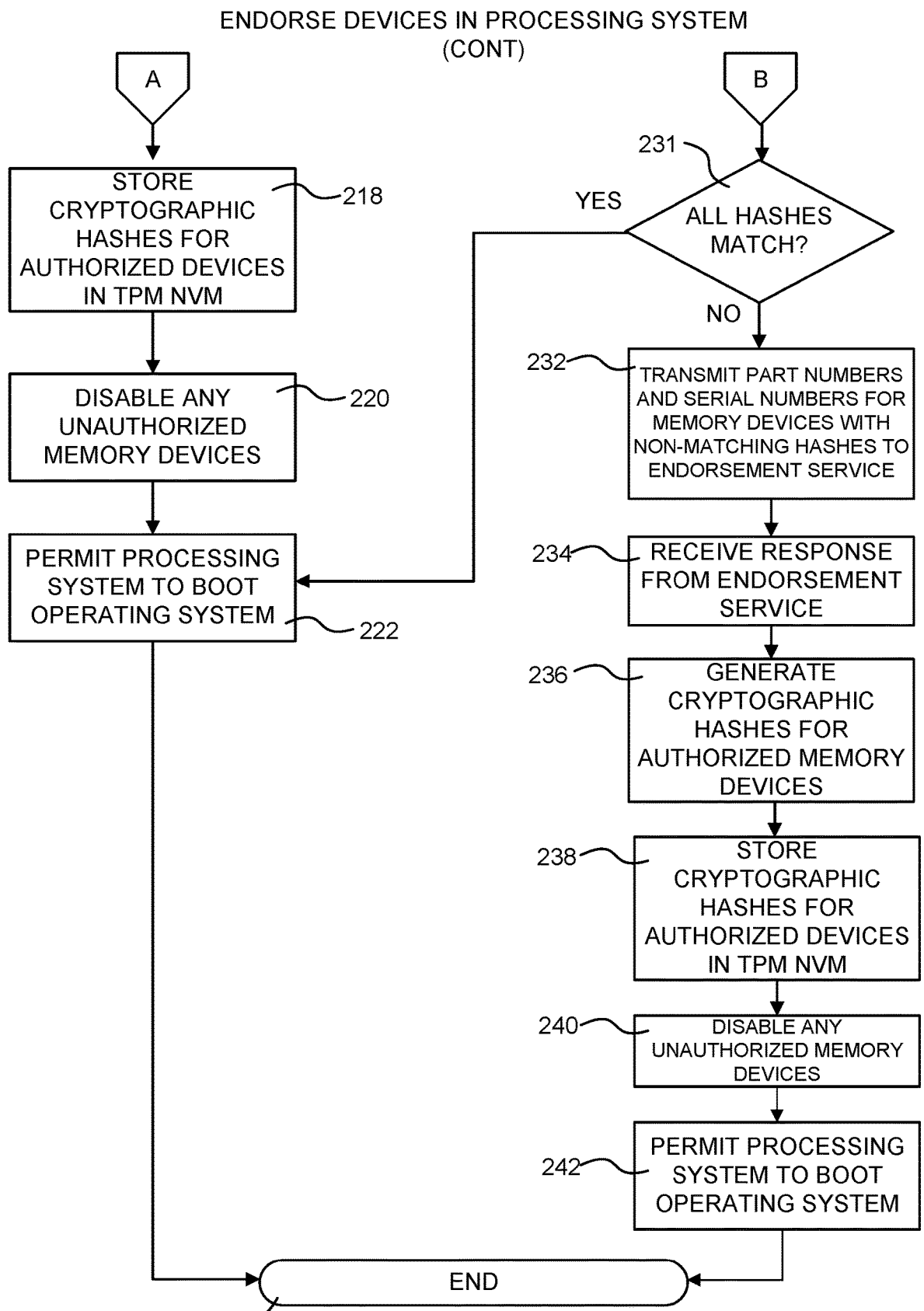
FIG. 2B is a flow diagram showing additional aspects of the routine shown in FIG. 2A for endorsement of devices in a processing system, according to one embodiment disclosed herein.

FIGS. 2A and 2B are flow diagrams showing aspects of a routine 200 for endorsement of devices in a processing system 100, according to one embodiment disclosed herein. It is to be appreciated that the logical operations described herein with respect to FIGS. 2A and 2B, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 200 begins at operation 202, where the firmware 112 executes upon power on of the processing system 100. From operation 202, the routine 200 proceeds to operation 204, where the firmware 112 identifies any memory devices 104 that are present in the processing system 100. The firmware 112 then initializes the identified memory devices 104 at operation 206.

From operation 206, the routine 200 proceeds to operation 208, where the firmware 112 obtains uniquely identifying information for the identified memory devices 104 such as, for example, part numbers 110 and serial numbers 108. As discussed above, in an embodiment where the memory devices 104 are DIMMs, the firmware 112 retrieves the uniquely identifying information (e.g., the part numbers 110 and serial numbers 108 for the DIMMs) from SPD data 106 that is stored in the DIMMs during manufacturing. The firmware 112 obtains other types of uniquely identifying information from the memory devices 104 or other devices in other embodiments.

From operation 208, the routine 200 proceeds to operation 210, where the firmware 112 determines if the processing system 100 is booting for the first time. If so, the routine 200 proceeds from operation 210 to operation 212, where the firmware 112 transmits an endorsement request 114 that includes the uniquely identifying information (e.g., the part numbers 110 and serial numbers 108) for the memory devices 104 to the endorsement service 116.

From operation 212, the routine 200 proceeds to operation 214, where the firmware 112 receives a response 122 from the endorsement service 116 that identifies any of the memory devices 104 that are not authorized for use with the processing system 100. The response 122 might also identify those memory devices 104 that are authorized for use in the processing system 100.

From operation 214, the routine 200 proceeds to operation 216, where the firmware 112 generates cryptographic hashes 124A for the memory devices 104 that have been identified by the endorsement service 116 as being authorized for use with the processing system 100. As discussed above, the SHA-512 hashing algorithm is utilized in an embodiment. The routine 200 then proceeds from operation 216 to operation 218, where the firmware 112 stores the cryptographic hashes 124A at the processing system. For example, the firmware 112 stores the cryptographic hashes in the NVM 126 of the TPM 128 in an embodiment.

From operation 218, the routine 200 proceeds to operation 220, where the firmware 112 disables any memory devices 104 identified by the endorsement service 116 as not being authorized for use with the processing system 100. The routine 200 then proceeds to operation 222, where the firmware 112 permits the processing system 100 to continue booting. For example, the processing system 100 may boot an operating system. From operation 222, the routine 200 proceeds to operation 224, where it ends.

If, at operation 210, the firmware 112 determines that the processing system 100 is not booting for the first time, the routine 200 proceeds from operation 210 to operation 226. At operation 226, the firmware 112 generates cryptographic hashes 124B for the memory devices 104 currently present in the processing system 100. The routine 200 then proceeds from operation 226 to operation 228, where the firmware 112 retrieves the cryptographic hashes 124A that were previously generated and stored in the TPM 128 at operation 218, described above.

From operation 228, the routine 200 proceeds to operation 230, where the firmware 112 then determines if the newly generated cryptographic hashes 124B for the memory devices 104 currently present in the processing system 100 match the previously stored cryptographic hashes 124A for the memory devices 104 that the endorsement service 116 indicated are authorized for use with the processing system 100.

If the firmware 112 determines that the cryptographic hashes 124B for the memory devices 104 currently present in the processing system 100 match the previously stored cryptographic hashes 124A, the routine 200 proceeds from operation 231 to operation 222 described above. If, however, the firmware 112 determines that the cryptographic hashes 124B for the memory devices 104 currently present in the processing system 100 do not match the previously stored cryptographic hashes 124A, this indicates that one or more new memory devices 104 have been added to the processing system 100 or that one or more previously identified memory devices 104 are malfunctioning and returning incorrect identifying information. In this case, the routine 200 proceeds from operation 231 to operation 232, where the firmware 112 transmits another request 114 with the uniquely identifying information (e.g., the part numbers 110 and serial numbers 108) for memory devices 104 that do not have matching previously stored cryptographic hashes 124A to the endorsement service 116.

From operation 232, the routine 200 proceeds to operation 234, where the firmware 112 receives the response 122 from the endorsement service 116 that identifies any of the memory devices 104 that do not have matching previously stored cryptographic hashes 124A and that are not authorized for use with the processing system 100. The routine 200 then proceeds from operation 234 to operation 236, where the firmware 112 generates cryptographic hashes 124 for memory devices 104 that do not have matching previously stored cryptographic hashes 124A but that the endorsement service 116 identifies as being authorized for use with the processing system 100. The firmware 112 stores these cryptographic hashes 124 at the processing system 100 such as, for example, in the NVM 126 of the TPM 128 in the processing system 100 at operation 238.

The routine 200 then proceeds from operation 238 to operation 240, where the firmware 112 disables any memory devices 104 that do not have matching previously stored cryptographic hashes 124A and that the endorsement service 116 indicated are not authorized for use with the processing system 100. The routine 200 then proceeds from operation 240 to operation 242, where the firmware 112 permits the processing system 100 to continue booting. For example, the processing system 100 may boot an operating system. From operation 242, the routine 200 proceeds to operation 224, where it ends.

Figure 3:
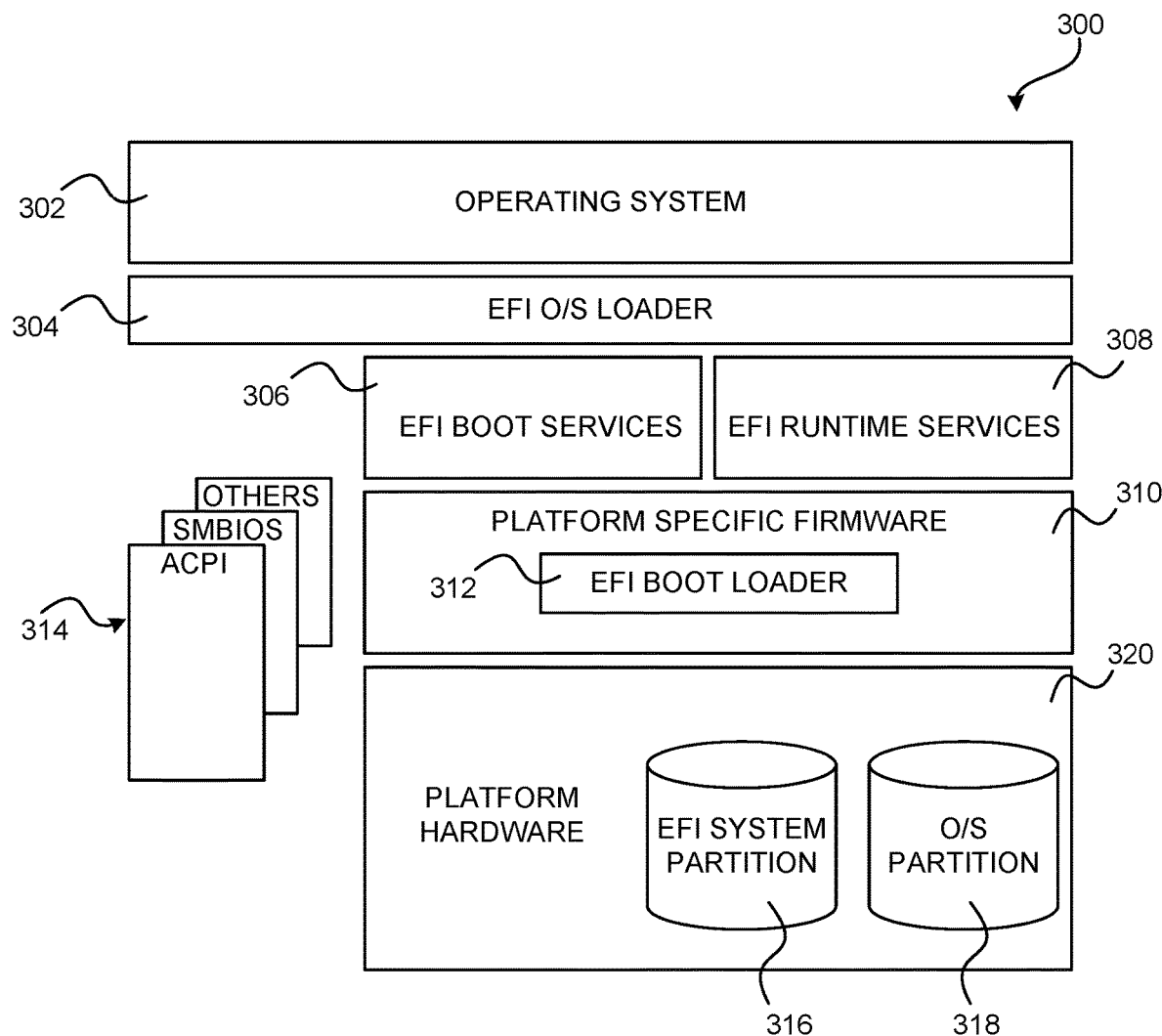
FIG. 3 is a software architecture diagram illustrating a software architecture for a unified extensible firmware interface ("UEFI")-compliant firmware that provides an operating environment for aspects of the technologies presented herein in one embodiment.

Turning now to FIG. 3, a software architecture diagram will be described that illustrates an architecture for a Unified Extensible Firmware Interface ("UEFI") Specification-compliant firmware 300 that can be configured to provide and/or utilize aspects of the technologies disclosed herein. In particular, the firmware architecture shown in FIG. 3 can be utilized to implement the firmware 112 described above. The firmware 112 can also be implemented in other ways in other configurations.

The UEFI Specification describes an interface between an operating system 302 and a UEFI Specification-compliant firmware 300. The UEFI Specification also defines an interface that a firmware 300 can implement, and an interface that an operating system 302 can use while booting. How a firmware implements the interface can be left up to the manufacturer of the firmware. The UEFI Specification also defines a way for an operating system 302 and a firmware 300 to exchange information necessary to support the operating system boot process. The term "UEFI Specification" used herein refers to both the EFI Specification developed by INTEL CORPORATION and the UEFI Specification managed by the UEFI FORUM.

As shown in FIG. 3, the architecture can include platform hardware 320, such as that described below with regard to FIG. 4, platform specific firmware 310, and an operating system 302. A boot loader 312 for the operating system 302 can be retrieved from the UEFI system partition 316 using a UEFI operating system loader 304. The UEFI system partition 316 can be an architecturally shareable system partition. As such, the UEFI system partition 316 can define a partition and file system designed to support safe sharing of mass storage between multiple vendors. An OS partition 318 can also be utilized.

Once started, the UEFI OS loader 304 can continue to boot the complete operating system 302. In doing so, the UEFI OS loader 304 can use UEFI boot services 306, an interface to other supported specifications, to survey, comprehend, and initialize the various platform components and the operating system software that manages them. Thus, interfaces 314 from other specifications can also be present on the system. For example, the advanced configuration and power interface ("ACPI") and the System Management BIOS ("SMBIOS") specifications can be supported.

UEFI boot services 306 can provide interfaces for devices and system functionality used during boot time. UEFI runtime services 308 can also be available to the UEFI OS loader 304 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the operating system 302 and system firmware 300, the Framework is a group of specifications that together describe a firmware implementation that has been designed to perform the full range of operations that are required to initialize a platform from power on through transfer of control to the operating system 302. The specifications that make up the Framework, which are also available from INTEL CORPORATION, are also expressly incorporated herein by reference.

Figure 4:
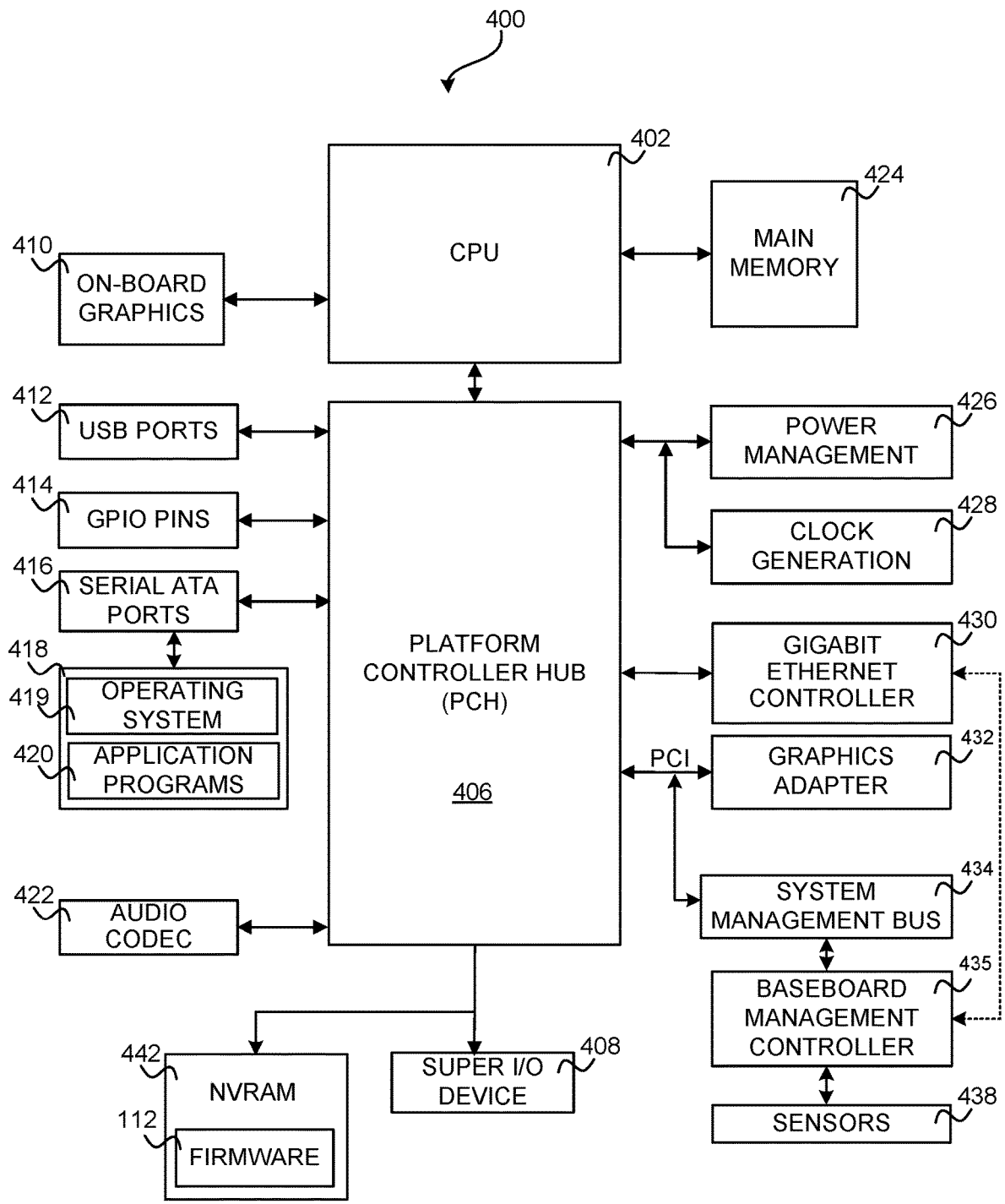
FIG. 4 is a computer architecture diagram that shows an illustrative architecture for a computer that can implement the technologies disclosed herein, according to an embodiment.

Referring now to FIG. 4, a computer architecture diagram that shows an illustrative architecture for a computer that can provide an operating environment for the technologies presented herein will be described. For example, and without limitation, the computer architecture shown in FIG. 4 can be utilized to implement the processing system 100, computing systems within the management system 120 such as those implementing the endorsement service 116, and/or any of the other computing systems described herein.

FIG. 4 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 4 shows an illustrative computer architecture for a computer 400 that can be utilized to implement the technologies described herein. The computer 400 includes a baseboard, or "motherboard", which is a printed circuit board to which a multitude of components or devices can be connected by way of a system bus or other electrical communication path. In one illustrative configuration, a central processing unit ("CPU") 402 operates in conjunction with a Platform Controller Hub ("PCH") 406. The CPU 402 is a central processor that performs arithmetic and logical operations necessary for the operation of the computer 400. The computer 400 can include a multitude of CPUs 402. Each CPU 402 might include multiple processing cores.

The CPU 402 provides an interface to a random access memory ("RAM") used as the main memory 424 in the computer 400 and, possibly, to an on-board graphics adapter 410. The PCH 406 provides an interface between the CPU 402 and the remainder of the computer 400.

The PCH 406 can also be responsible for controlling many of the input/output functions of the computer 400. In particular, the PCH 406 can provide one or more universal serial bus ("USB") ports 412, an audio codec 422, a Gigabit Ethernet Controller 432, and one or more general purpose input/output ("GPIO") pins 414. The USB ports 412 can include USB 2.0 ports, USB 3.0 ports and USB 3.1 ports among other types of USB ports. The audio codec 422 can include Intel High Definition Audio, Audio Codec '97 ("AC'97") and Dolby TrueHD among others.

The PCH 406 can also include functionality for providing networking functionality through a Gigabit Ethernet Controller 430. The Gigabit Ethernet Controller 430 is capable of connecting the computer 400 to another computer via a network. Connections which can be made by the Gigabit Ethernet Controller 430 can include local area network ("LAN") or wide area network ("WAN") connections. LAN and WAN networking environments are commonplace in offices, enterprise-wide computer networks, intranets, and the Internet.

The PCH 406 can also provide a bus for interfacing peripheral card devices such as a graphics adapter 432. In one configuration, the bus comprises a Peripheral Component Interconnect ("PCI") bus. The PCI bus can be a Peripheral Component Interconnect extended ("PCI-X") bus or a Peripheral Component Interconnect Express ("PCIe") bus among others, according to embodiments. Other types of buses are utilized in other embodiments.

The PCH 406 can also provide a system management bus 434 for use in managing the various components of the computer 400. Additional details regarding the operation of the system management bus 434 and its connected components are provided below. Power management circuitry 426 and clock generation circuitry 428 can also be utilized during the operation of the PCH 406.

The PCH 406 is also configured to provide one or more interfaces for connecting mass storage devices to the computer 400. For instance, according to one configuration, the PCH 406 includes a serial advanced technology attachment ("SATA") adapter for providing one or more SATA ports 416. The SATA ports 416 can be connected to one or more mass storage devices storing an OS, such as OS 419 and application programs 420, such as a SATA disk drive 418. As known to those skilled in the art, an OS 419 comprises a set of programs that control operations of a computer and allocation of resources. An application program 420 is software that runs on top of the operating system 419, or other runtime environment, and uses computer resources to perform application specific tasks desired by the user.

According to one configuration, the OS 419 comprises the LINUX operating system. According to another configuration, the OS 419 comprises the WINDOWS operating system from MICROSOFT CORPORATION. According to another configuration, the OS 419 comprises the UNIX operating system or one of its variants. It should be appreciated that other operating systems can also be utilized.

The mass storage devices connected to the PCH 406, and their associated computer-readable storage media, provide non-volatile storage for the computer 400. Although the description of computer-readable storage media contained herein refers to a mass storage device, such as a hard disk or CD-ROM drive, it should be appreciated by those skilled in the art that computer-readable storage media can be any available media that can be accessed by the computer 400.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals.

Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 400.

A low pin count ("LPC") interface can also be provided by the PCH 406 for connecting a Super I/O device 408. The Super I/O device 408 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 442 for storing firmware 112 that includes program code containing the basic routines that help to start up the computer 400 and to transfer information between elements within the computer 400 as discussed above with regard to FIG. 3.

It should be appreciated that the program modules disclosed herein, including the firmware 112, can include software instructions that, when loaded into the CPU 402 and executed, transform a general-purpose computer 400 into a special-purpose computer 400 customized to facilitate all, or part of, the operations disclosed herein. As detailed throughout this description, the program modules can provide various tools or techniques by which the computer 400 can participate within the overall systems or operating environments using the components, logic flows, and/or data structures discussed herein.

The CPU 402 can be constructed from any number of transistors or other circuit elements, which can individually or collectively assume any number of states. More specifically, the CPU 402 can operate as a state machine or finite-state machine. Such a machine can be transformed to a second machine, or a specific machine, by loading executable instructions contained within the program modules. These computer-executable instructions can transform the CPU 402 by specifying how the CPU 402 transitions between states, thereby transforming the transistors or other circuit elements constituting the CPU 402 from a first machine to a second machine, wherein the second machine can be specifically configured to perform the operations disclosed herein. The states of either machine can also be transformed by receiving input from one or more user input devices, network interfaces (such as the Gigabit Ethernet Controller 430), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to the technology used to implement the storage media, whether the storage media are characterized as primary or secondary storage, and the like. For example, if the storage media are implemented as semiconductor-based memory, the program modules can transform the physical state of the semiconductor main memory 424 and/or NVRAM 404. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 406 can include a system management bus 434. A baseboard management controller ("BMC") 435 can be connected to the system management bust 434. A BMC 435 is a microcontroller that monitors aspects of the operation of the computer 400. In a more specific configuration, the BMC 435 monitors inventory and health-related aspects associated with the computer 400, such as, but not limited to, the temperature of one or more components of the computer 400, speed of rotational components (e.g., spindle motor, CPU fan, etc.) within the computer 400, the voltage across or applied to one or more components within the computer 400, and the available and/or used capacity of memory devices within the computer 400. To accomplish these monitoring functions, the BMC 435 is communicatively connected to one or more components by way of the system management bus 434 in some configurations.

In one configuration, these components include sensor devices 438 for measuring various operating and performance-related parameters within the computer 400. The sensor devices 438 can be either hardware or software based components configured or programmed to measure or detect one or more of the various operating and performance-related parameters.

The BMC 435 functions as the master on the system management bus 434 in most circumstances but can also function as either a master or a slave in other circumstances. Each of the various components communicatively connected to the BMC 435 by way of the system management bus 434 is addressed using a slave address. The system management bus 434 is used by the BMC 435 to request and/or receive various operating and performance-related parameters from one or more components, such as the firmware 112, which are also communicatively connected to the system management bus 434.

It should be appreciated that the functionality provided by the computer 400 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 400 might not include all the components shown in FIG. 4, can include other components that are not explicitly shown in FIG. 4, such as the TPM 128, or might utilize an architecture completely different than that shown in FIG. 4.

Based on the foregoing, it should be appreciated that technologies for endorsement of devices in a processing system have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method, comprising:
executing a firmware on a processing system;
identifying, by way of the firmware, one or more memory devices present in the processing system;
retrieving, by way of the firmware, uniquely identifying information for each of the identified one or more memory devices present in the processing system;
upon a first boot of the processing system,
   transmitting, by way of the firmware, the uniquely identifying information from the firmware to an endorsement service,
   receiving a response from the endorsement service at the firmware, the response identifying any of the one or more memory devices that are not authorized for use with the processing system,
   disabling, by way of the firmware, the one or more memory devices that are not authorized for use with the processing system,
   generating cryptographic hashes, by way of the firmware, for the one or more memory devices that are authorized for use with the processing system,
   storing, by way of the firmware, the cryptographic hashes at the processing system, and
   permitting, by way of the firmware, the processing system to boot; and
upon a boot of the processing system subsequent to the first boot:
   generating, by way of the firmware, cryptographic hashes for the one or more memory devices present in the processing system at a time of the boot of the processing system subsequent to the first boot,
   determining, by way of the firmware, if the cryptographic hashes for the one or more memory devices present in the processing system match the stored cryptographic hashes for the one or more memory devices that are authorized for use with the processing system, and
   responsive to determining that the cryptographic hashes for the one or more memory devices present in the processing system do not match the stored cryptographic hashes for the one or more memory devices that are authorized for use with the processing system,
      transmitting, by way of the firmware, the uniquely identifying information for memory devices not having matching previously stored cryptographic hashes from the firmware to the endorsement service,
      receiving a response from the endorsement service at the firmware, the response identifying any of the memory devices not having matching previously stored cryptographic hashes that are not authorized for use with the processing system, and
      disabling, by way of the firmware, the one or more memory devices not having matching previously stored cryptographic hashes that are not authorized for use with the processing system.

2. The computer-implemented method of claim 1, wherein the memory devices comprise dual in-line memory modules ("DIMMs").

3. The computer-implemented method of claim 2, wherein the uniquely identifying information comprises part numbers and serial numbers for the DIMMs.

4. The computer-implemented method of claim 3, wherein the firmware retrieves the uniquely identifying information from serial presence detect ("SPD") data stored in the DIMMs.

5. The computer-implemented method of claim 4, wherein the firmware stores the cryptographic hashes in a non-volatile memory ("NVM") of a trusted platform module ("TPM").

6. The computer-implemented method of claim 1, further comprising upon the boot of the processing system subsequent to the first boot:
generating, by way of the firmware, cryptographic hashes for memory devices not having matching previously stored cryptographic hashes that are authorized for use with the processing system;
storing, by way of the firmware, the cryptographic hashes for memory devices not having matching previously stored cryptographic hashes that are authorized for use with the processing system at the processing system; and
permitting, by way of the firmware, the processing system to boot.

7. At least one non-transitory computer-readable storage medium having computer-executable instructions stored thereupon which, when executed by a processing system, cause the processing system to:
execute a firmware on a processing system;
identify, by way of the firmware, one or more memory devices present in the processing system;
retrieve, by way of the firmware, uniquely identifying information for each of the identified one or more memory devices present in the processing system;
upon a first boot of the processing system,
transmit, by way of the firmware, the uniquely identifying information from the firmware to an endorsement service,
receive a response from the endorsement service at the firmware, the response identifying any of the one or more memory devices that are not authorized for use with the processing system,
disable, by way of the firmware, the one or more memory devices that are not authorized for use with the processing system,
generate cryptographic hashes, by way of the firmware, for the one or more memory devices that are authorized for use with the processing system,
store, by way of the firmware, the cryptographic hashes at the processing system, and
permit, by way of the firmware, the processing system to boot; and
upon a boot of the processing system subsequent to the first boot,
generate, by way of the firmware, cryptographic hashes for the one or more memory devices present in the processing system at a time of the boot of the processing system subsequent to the first boot,
determine, by way of the firmware, if the cryptographic hashes for the one or more memory devices present in the processing system match the stored cryptographic hashes for the one or more memory devices that are authorized for use with the processing system, and
responsive to determining that the cryptographic hashes for the one or more memory devices present in the processing system do not match the stored cryptographic hashes for the one or more memory devices that are authorized for use with the processing system,
transmit, by way of the firmware, the uniquely identifying information for memory devices not having matching previously stored cryptographic hashes from the firmware to the endorsement service,
receive a response from the endorsement service at the firmware, the response identifying any of the memory devices not having matching previously stored cryptographic hashes that are not authorized for use with the processing system, and
disable, by way of the firmware, the one or more memory devices not having matching previously stored cryptographic hashes that are not authorized for use with the processing system.

8. The non-transitory computer-readable storage medium of claim 7, wherein the memory devices comprise dual in-line memory modules ("DIMMs").

9. The non-transitory computer-readable storage medium of claim 8, wherein the uniquely identifying information comprises part numbers and serial numbers for the DIMMs.

10. The non-transitory computer-readable storage medium of claim 9, wherein the firmware retrieves the uniquely identifying information from serial presence detect ("SPD") data stored in the DIMMs.

11. The non-transitory computer-readable storage medium of claim 10, wherein the firmware stores the cryptographic hashes in a non-volatile memory ("NVM") of a trusted platform module ("TPM").

12. The non-transitory computer-readable storage medium of claim 7, having further computer-executable instructions stored thereupon which, when executed by the processing system, cause the processing system to:
generate, by way of the firmware, cryptographic hashes for memory devices not having matching previously stored cryptographic hashes that are authorized for use with the processing system;
store, by way of the firmware, the cryptographic hashes for memory devices not having matching previously stored cryptographic hashes that are authorized for use with the processing system at the processing system; and
permit, by way of the firmware, the processing system to boot.

13. A processing system, comprising:
one or more processors;
one or more memory devices; and
one or more non-transitory computer-readable storage medium having computer-executable instructions stored thereupon which, when executed by the one or more processors, cause the processing system to:
execute a firmware on the one or more processors;
identify, by way of the firmware, the one or more memory devices in the processing system;
retrieve, by way of the firmware, uniquely identifying information for each of the identified one or more memory devices present in the processing system;
upon a first boot of the processing system,
transmit, by way of the firmware, the uniquely identifying information from the firmware to an endorsement service,
receive a response from the endorsement service at the firmware, the response identifying any of the one or more memory devices that are not authorized for use with the processing system,
disable, by way of the firmware, the one or more memory devices that are not authorized for use with the processing system, generate, by way of the firmware, cryptographic hashes for the one or more memory devices that are authorized for use with the processing system, store, by way of the firmware, the cryptographic hashes at the processing system, and permit, by way of the firmware, the processing system to boot; and upon a boot of the processing system subsequent to the first boot, generate, by way of the firmware, cryptographic hashes for the one or more memory devices present in the processing system at a time of the boot of the processing system subsequent to the first boot, determine, by way of the firmware, if the cryptographic hashes for the one or more memory devices present in the processing system match the stored cryptographic hashes for the one or more memory devices that are authorized for use with the processing system, and responsive to determining that the cryptographic hashes for the one or more memory devices present in the processing system do not match the stored cryptographic hashes for the one or more memory devices that are authorized for use with the processing system, transmit, by way of the firmware, the uniquely identifying information for memory devices not having matching previously stored cryptographic hashes from the firmware to the endorsement service, receive a response from the endorsement service at the firmware, the response identifying any of the memory devices not having matching previously stored cryptographic hashes that are not authorized for use with the processing system, disable, by way of the firmware, the one or more memory devices not having matching previously stored cryptographic hashes that are not authorized for use with the processing system, generate, by way of the firmware, cryptographic hashes for memory devices not having matching previously stored cryptographic hashes that are authorized for use with the processing system, store, by way of the firmware, the cryptographic hashes for memory devices not having matching previously stored cryptographic hashes that are authorized for use with the processing system at the processing system, and permit, by way of the firmware, the processing system to boot.

14. The computing system of claim 13, wherein the memory devices comprise dual in-line memory modules ("DIMMs").

15. The computing system of claim 14, wherein the uniquely identifying information comprises part numbers and serial numbers for the DIMMs.

16. The computing system of claim 15, wherein the firmware retrieves the uniquely identifying information from serial presence detect ("SPD") data stored in the DIMMs.

17. The computing system of claim 16, wherein the firmware stores the cryptographic hashes in a non-volatile memory ("NVM") of a trusted platform module ("TPM").

* * * * *